(12) United States Patent
Jung et al.

(10) Patent No.: US 11,943,642 B2
(45) Date of Patent: Mar. 26, 2024

(54) APPARATUS AND METHOD FOR BEAM FAILURE RECOVERY IN WIRELESS COMMUNICATION SYSTEM

(71) Applicant: Samsung Electronics Co., Ltd., Suwon-si (KR)

(72) Inventors: Byounghoon Jung, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 17/346,859

(22) Filed: Jun. 14, 2021

(65) Prior Publication Data
US 2021/0306880 A1    Sep. 30, 2021

Related U.S. Application Data

(63) Continuation of application No. 16/376,296, filed on Apr. 5, 2019, now Pat. No. 11,039,325.

(30) Foreign Application Priority Data

Apr. 5, 2018  (KR) ........................ 10-2018-0039850

(51) Int. Cl.
*H04W 24/04*    (2009.01)
*H04B 7/06*    (2006.01)
(Continued)

(52) U.S. Cl.
CPC .......... *H04W 24/04* (2013.01); *H04B 7/0617* (2013.01); *H04W 24/08* (2013.01);
(Continued)

(58) Field of Classification Search
CPC ... H04W 4/021; H04W 64/003; H04W 4/029; H04W 84/12; H04W 48/04; H04W 64/00;
(Continued)

(56) References Cited

U.S. PATENT DOCUMENTS 9,729,295 B2    8/2017 Zhang et al.
2014/0302855 A1   10/2014 Nory et al.
(Continued)

FOREIGN PATENT DOCUMENTS

CN    106572533 A    4/2017
CN    107667547 A    2/2018

OTHER PUBLICATIONS

Indian Office Action dated Aug. 29, 2022, issued in Indian Application No. 202037048081.
(Continued)

*Primary Examiner* — Fred A Casca
(74) *Attorney, Agent, or Firm* — Jefferson IP Law, LLP

(57) ABSTRACT

The disclosure relates to a pre-5$^{th}$-generation (5G) or 5G communication system to be provided for supporting higher data rates beyond 4$^{th}$-Generation (4G) communication system, such as long term evolution (LTE). A method for operating a terminal in wireless communication system is provided. The method includes receiving, from a base station, system information including at least one parameter associated a paging operation, and monitoring a paging occasion (PO) that is determined based on the at least one parameter, during a discontinuous reception (DRX) operation.

20 Claims, 26 Drawing Sheets

(51) Int. Cl.

| | | |
|---|---|---|
| *H04W 24/08* | (2009.01) | |
| *H04W 56/00* | (2009.01) | |
| *H04W 72/044* | (2023.01) | |
| *H04W 72/542* | (2023.01) | |
| *H04W 74/02* | (2009.01) | |
| *H04W 74/0833* | (2024.01) | |
| *H04W 76/11* | (2018.01) | |
| *H04W 80/02* | (2009.01) | |
| *H04W 88/02* | (2009.01) | |
| H04W 68/00 | (2009.01) | |
| H04W 76/28 | (2018.01) | |

(52) U.S. Cl.
CPC ....... *H04W 56/001* (2013.01); *H04W 72/046* (2013.01); *H04W 72/542* (2023.01); *H04W 74/02* (2013.01); *H04W 74/0833* (2013.01); *H04W 76/11* (2018.02); *H04W 80/02* (2013.01); *H04W 88/023* (2013.01); *H04W 68/00* (2013.01); *H04W 76/28* (2018.02)

(58) Field of Classification Search
CPC . H04W 74/0833; H04W 24/02; H04W 24/08; H04W 28/06; H04W 72/21; H04W 74/006; H04W 80/02; H04W 72/1268; H04L 69/321; H04L 69/324
See application file for complete search history.

(56) References Cited

U.S. PATENT DOCUMENTS

| | | | |
|---|---|---|---|
| 2016/0014716 | A1 | 1/2016 | Tabet et al. |
| 2018/0027593 | A1 | 1/2018 | Lee |
| 2018/0083753 | A1 | 3/2018 | Nagaraja et al. |
| 2018/0317198 | A1 | 11/2018 | Lee et al. |
| 2018/0376501 | A1 | 12/2018 | John Wilson et al. |
| 2019/0159226 | A1 | 3/2019 | Ly et al. |
| 2019/0150114 | A1 | 5/2019 | Liu et al. |
| 2019/0166622 | A1 | 5/2019 | Kim et al. |
| 2019/0246410 | A1 | 8/2019 | Zhang et al. |
| 2020/0120579 | A1 | 4/2020 | Byun et al. |
| 2020/0213978 | A1 | 7/2020 | Iyer et al. |
| 2020/0383165 | A1* | 12/2020 | Takahashi ............. H04W 76/19 |
| 2022/0225135 | A1* | 7/2022 | Cirik ..................... H04L 5/0091 |
| 2022/0264475 | A1* | 8/2022 | Yi ...................... H04W 72/046 |

OTHER PUBLICATIONS

U.S. Non-Final Office Action dated Apr. 29, 2020, issue in U.S. Appl. No. 16/376,172.

Huawei et al., Definition of Paging Occasion, 3GPP TSG-RAN WG2 #101, R2-1803644 (revision of R2-1801096), Athens, Greece, Feb. 16, 2018.
Qualcomm Incorporated, Default Association between SSB and Paging Monitoring, 3GPP TSG-RAN WG2 #101, R2-1803578, Athens, Greece, Feb. 16, 2018.
Intel Corporation, Calculation of paging occasion, 3GPP RAN WG2#101, R2-1802976, Athens, Greece, Feb. 16, 2018.
Mediatek Inc., Paging and SS Block Transmission in NR, 3GPP TSG-RAN WG2 Meeting AH-1801, R2-1801304, Vancouver, Canada, Jan. 12, 2018.
International Search Report dated Jul. 16, 2019, issued in the International Application No. PCT/KR2019/004078.
U.S. Notice of Allowance dated Oct. 9, 2020, issued in U.S. Appl. No. 16/376,172.
Ericsson, "Contention based random access for beam failure recovery," 3GPP TSG-RAN WG2 #101 Tdoc R2-1803198 (Revision of R2-1800340), Athens, Greece, Feb. 26-Mar. 2, 2018.
Vivo, "Remaining issues of beam failure recovery and corresponding TP," 3GPP TSG-RAN WG2 Meeting #101 R2-1802085, Athens, Greece, Feb. 26-Mar. 2, 2018.
Korean Office Action dated Jun. 9, 2022, issued in Korean Application No. 10-2018-0039850.
Huawei et al., "Definition of Paging Occasion," 3GPP TSG-RAN WG2 #101 R2-1803644, Athens, Greece, Feb. 26-Mar. 2, 2018.
Qualcomm Inc., "Default Association between SSB and Paging Monitoring," 3GPP TSG-RAN WG2 Meeting #101 R2-1803578, Athens, Greece, Feb. 26-Mar. 2, 2018.
Intel Corp., "Calculation of paging occasion," 3GPP RAN WG2#101 R2-1802976, Athens, Greece, Jan. 26-Mar. 2, 2018.
Notice of Patent Grant dated Jun. 8, 2023, issued in Korean Application No. 10-2018-0039850.
Intention to Grant dated Jun. 13, 2023, issued in European Application No. 19 782 253.9.
Samsung Electronics; Correction to description of PO for default association; 3GPP TSG-RAN2 103bis; R2-1813689; Oct. 8-12, 2018; Chengdu, China.
SAMSUNG; System Information Signalling Design in NR; 3GPP TSG-RAN WG2 Meeting #95; R2-164693; Aug. 22-26, 2016; Gothenburg, Sweden.
SAMSUNG; On Demand SI: Additional TX Indication; 3GPP TSG-RAN WG2 Meeting #98; R2-1704064; May 15-19, 2017; Hangzhou, China.
ZTE et al.; Consideration on the signalling structure for RA; 3GPP TSG-RAN WG2 Meeting #101; R2-1803115; Feb. 26-Mar. 2, 2018; Athens, Greece.
Samsung; SIB1 Content for SI Request; 3GPP TSG-RAN2 101bis; R2-1804881; Apr. 16-20, 2018; Sanya, China.
Chinese Office Action with English translation dated Sep. 28, 2023; Chinese Appln. No. 201980023488.0.
European Search Report dated Oct. 26, 2023; European Appln. No. 23181814.7-1216/4255031.

* cited by examiner

| 602 | 604 | 606 | 608 |
|---|---|---|---|
| MAC Subheader (LCID = X) | C-RNTI MAC CE (Includes C-RNTI) | MAC Subheader (LCID = Y) | BFR MAC CE (Includes CSI-RS ID) |

FIG.6

| 1302 | 1304 |
|---|---|
| MAC Subheader (LCID = Y) | BFR MAC CE (Includes C-RNTI, CSI-RS ID(optional)*) *1 bit in MAC CE Indicates whether CSI RS ID is included or not |

FIG.13

APPARATUS AND METHOD FOR BEAM FAILURE RECOVERY IN WIRELESS COMMUNICATION SYSTEM

CROSS-REFERENCE TO RELATED APPLICATION(S)

This application is a continuation application of prior application Ser. No. 16/376,296, filed on Apr. 5, 2019, which has issued as U.S. Pat. No. 11,039,325, on Jun. 15, 2021, and is based on and claims priority under 35 U.S.C. § 119(a) of a Korean patent application number 10-2018-0039850, filed on Apr. 5, 2018, in the Korean Intellectual Property Office, the disclosure of which is incorporated by reference herein in its entirety.

BACKGROUND

1. Field

The disclosure relates generally to a wireless communication system. More particularly, the disclosure relates to an apparatus and a method for beam failure recovery (BFR) in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system needs to utilize an adequate beam for effective beamforming. For doing so, various methods for selecting, tracking, or maintaining an optimal beam are under discussion.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively performing beam failure recovery (BFR) in a wireless communication system.

Another aspect of the disclosure is to provide an apparatus and a method for effectively monitoring paging in a wireless communication system.

Additional aspects will be set forth in part in the description which follows and, in part, will be apparent from the description, or may be learned by practice of the presented embodiments.

According to an embodiment of the disclosure, a method for BFR in a wireless communication system is provided. The method includes transmitting a preamble signal for random access (RA), receiving a first message including a RA response (RAR) corresponding to the preamble signal, and transmitting a second signal corresponding to the first message, wherein the second message may include at least one of a cell-radio network temporary identifier (ID) (C-RNTI) media access control (MAC) control element (CE) or a BFR MAC CE.

According to an embodiment of the disclosure, a method for operating a terminal in wireless communication system is provided. The method includes receiving, from a base station, system information including at least one parameter associated a paging operation, and monitoring a paging occasion (PO) that is determined based on the at least one parameter, during a discontinuous reception (DRX) operation. Herein, the PO includes at least one physical downlink control channel (PDCCH) monitoring occasion, and the at least one PDCCH monitoring occasion corresponds to at least one synchronization signal block (SSB) transmitted from the base station.

According to an embodiment of the disclosure, a method for operating a base station in wireless communication system is provided. The method includes transmitting, to a terminal, system information including at least one parameter associated a paging operation, and transmitting, to the terminal, a paging message in a PO that is determined based on the at least one parameter, during a DRX operation of the terminal. Herein, the PO includes at least one PDCCH monitoring occasion, and wherein the at least one PDCCH monitoring occasion corresponds to at least one SSB transmitted from the base station.

According to an embodiment of the disclosure, a method for operating a terminal in wireless communication system is provided. The method includes receiving, from a base station, system information including first configuration information associated with a request of system information messages that are provided on demand, and transmitting, to the base station, a signal for requesting at least one of the system information messages based on the first configuration information. Herein, if the first configuration information includes one configuration entry, the one configuration entry is used to request all of the system information messages.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a Msg3 structure in a wireless communication system according to an embodiment of the disclosure;

FIG. 13 illustrates a BFR MAC-CE structure included in a Msg3 in a wireless communication system according to an embodiment of the disclosure;

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular form "a," "an," and "the" include plural referents unless the context clearly dictates otherwise. Thus, for example, reference to "a component surface" includes reference to one or more of such surfaces.

In embodiments of the disclosure to be described below, a hardware approach will be described as an example. However, since the embodiments of the disclosure include a technology using both hardware and software, the embodiments of the disclosure do not exclude a software-based approach.

Embodiments of the disclosure provide an apparatus and a method for performing beam failure recovery (BFR) in a wireless communication system. More specifically, the disclosure provides a technique for providing uplink information and prioritizing a logical channel for the BFR in the wireless communication system.

Terms indicating signals, terms indicating messages, terms indicating channels, terms indicating control information, terms indicating network entities, and terms indicating components of a device, which are used in the following descriptions, are for the sake of explanations. Accordingly, the disclosure is not limited to the terms to be described, and may use other terms having technically identical meaning.

The disclosure provides embodiments using terms used in some communication standards (e.g., 3rd Generation Partnership Project (3GPP)) by way of example. Embodiments of the disclosure may be easily used in other communication systems.

Figure 1:
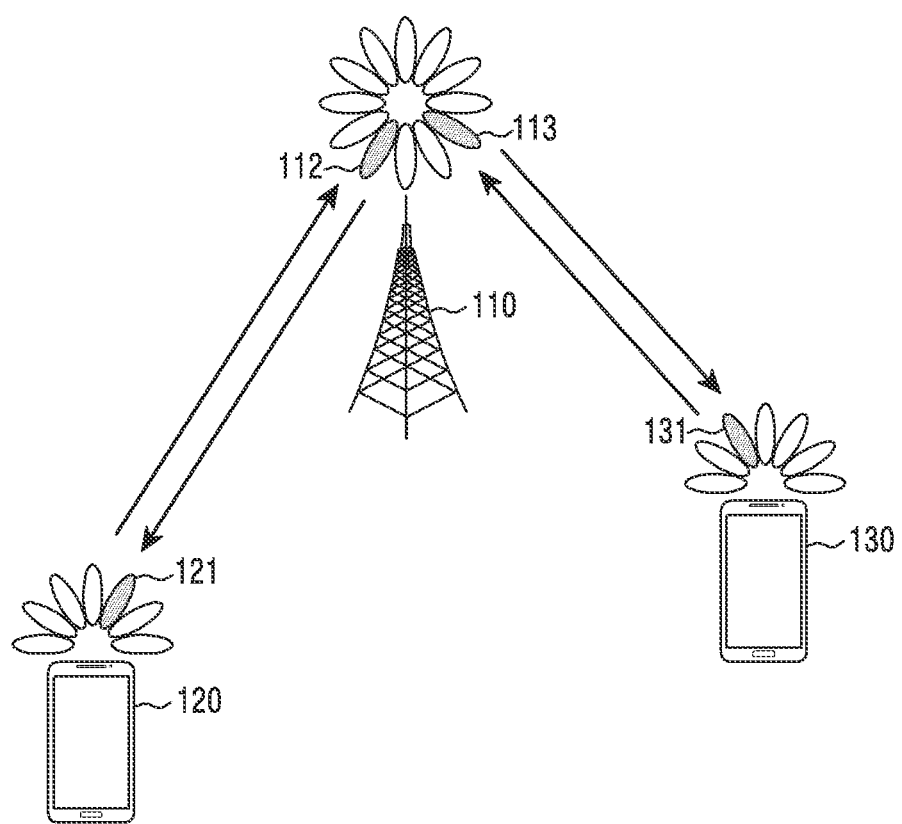
FIG. 1 illustrates a wireless communication system according to an embodiment of the disclosure.

FIG. 1 illustrates a wireless communication system according to an embodiment of the disclosure.

Referring to FIG. 1, a base station 110, a terminal 120, and a terminal 130, as some of nodes which use a radio channel in the wireless communication system. While FIG. 1 depicts the single base station, the same or similar base station to the base station 110 may be further included.

The base station 110 is a network infrastructure which provides radio access to the terminals 120 and 130. The base station 110 has coverage defined as a geographical area, based on a signal transmission distance. The base station 110 may be referred to as an access point (AP), an enodeb (eNB), a 5th generation node (5G node), a 5G nodeb (gNodeB, gNB), a wireless point, a transmission/reception point (TRP), or other term having a technically equivalent meaning.

The terminal 120 and the terminal 130 each are a device used by a user, and communicate with the base station 110 over a radio channel. In some cases, at least one of the terminal 120 and the terminal 130 may operate without user's involvement. For example, at least one of the terminal 120 and the terminal 130 performs machine type communication (MTC) and may not be carried by the user. The terminal 120 and the terminal 130 each may be referred to as a user equipment (UE), a mobile station, a subscriber station, a remote terminal, a wireless terminal, a user device, or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). To improve channel gain, the base station 110, the terminal 120, and the terminal 130 may conduct beamforming. Herein, the beamforming may include transmit beamforming and receive beamforming. For example, the base station 110, the terminal 120, and the terminal 130 may apply directivity to a transmit signal or a receive signal. For doing so, the base station 110 and the terminals 120 and 130 may select serving beams 112, 113, 121, and 131 through beam search or beam management. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

Figure 2:
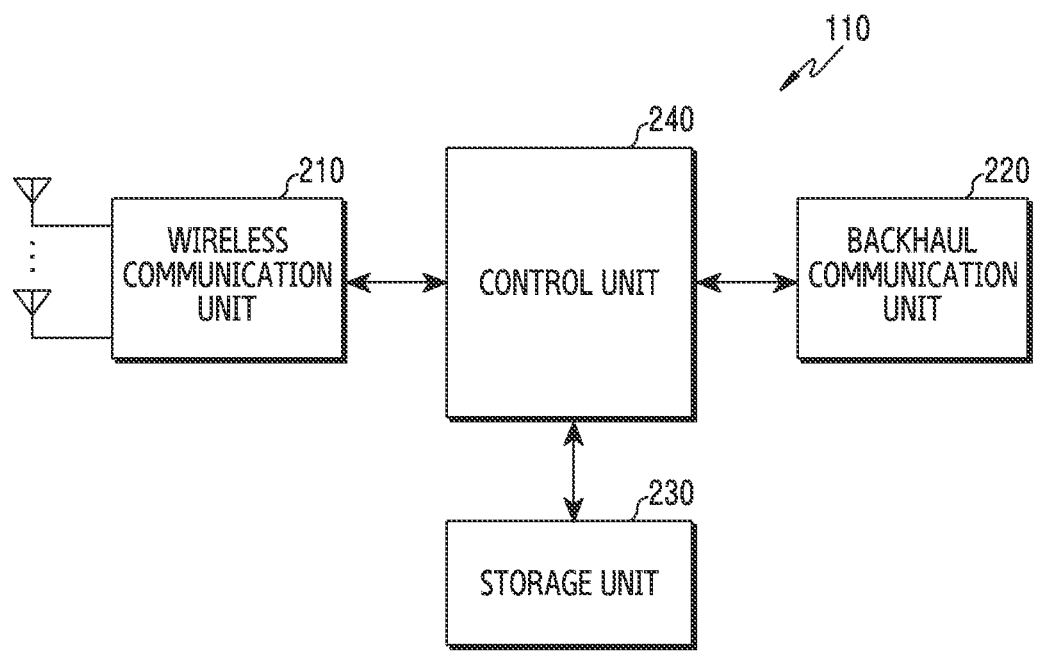
FIG. 2 illustrates a configuration of a base station in a wireless communication system according to an embodiment of the disclosure.

FIG. 2 illustrates a base station in a wireless communication system according to an embodiment of the disclosure. FIG. 2 depicts a configuration of the base station 110. A term, such as 'portion' or '~er' indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. In addition, in data reception, the wireless communication unit 210 restores a receive bit string by demodulating and decoding a baseband signal.

The wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements.

In view of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As such, the wireless communication unit 210 transmits and receives the signals. Hence, whole or part of the wireless communication unit 210 may be referred to as a transmitter, a receiver, or a transceiver. In the following, the transmission and the reception over the radio channel embrace the above-stated processing of the wireless communication unit 210.

The backhaul communication unit 220 provides an interface for communicating with other nodes in the network. For example, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data, such as configuration information. The storage unit 230 may include a volatile memory, a non-volatile memory, or a combination of a volatile memory and a non-volatile memory. The storage unit 230 provides the stored data in response to a request of the control unit 240.

The control unit 240 controls general operations of the base station. For example, the control unit 240 transmits and receives signals through the wireless communication unit 210 or the backhaul communication unit 220. In addition, the control unit 240 records and reads data in and from the storage unit 230. The control unit 240 may execute functions of a protocol stack requested by a communication standard. According to other embodiment of the disclosure, the protocol stack may be included in the wireless communication unit 210. For doing so, the control unit 240 may include at least one processor. According to various embodiments of the disclosure, the control unit 240 may control the base station to carry out operations to be explained according to various embodiments.

Figure 3:
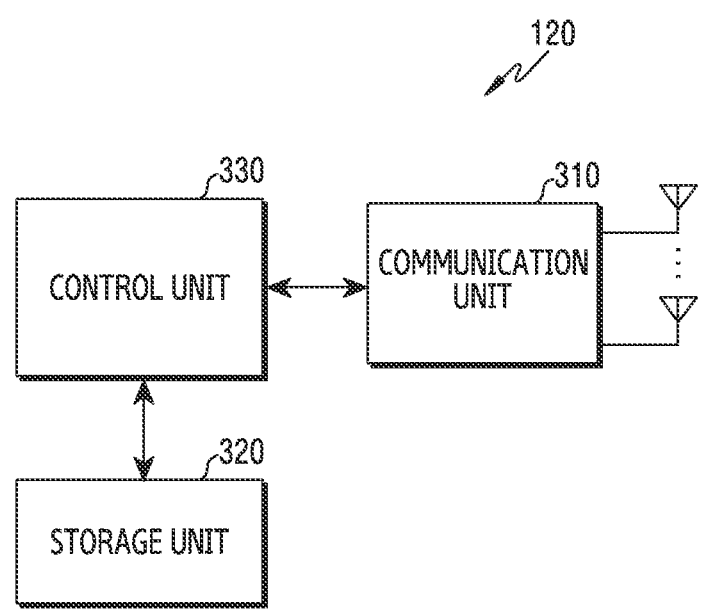
FIG. 3 illustrates a configuration of a terminal in a wireless communication system according to an embodiment of the disclosure.

FIG. 3 illustrates a configuration of a terminal in a wireless communication system according to an embodiment of the disclosure. FIG. 3 depicts a configuration of the terminal 120. A term, such as 'portion' or '~er' indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 may transmit and receive signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Moreover, in data reception, the communication unit 310 restores a receive bit string by demodulating and decoding a baseband signal. In addition, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Furthermore, the communication unit 310 may include a plurality of transmit and receive paths. Further, the communication unit 310 may include at least one antenna array including a plurality of antenna elements. In view of the hardware, the communication unit 310 may include a digital circuit and an analog circuit (e.g., an RF integrated circuit (RFIC)). Herein, the digital circuit and the analog circuit may be implemented as a single package. In addition, the communication unit 310 may include a plurality of RF chains. Further, the communication unit 310 may perform the beamforming.

As such, the communication unit 310 transmits and receives the signals. Hence, whole or part of the communication unit 310 may be referred to as a transmitter, a receiver, or a transceiver. Hereafter, the transmission and the reception over the radio channel embrace the above-stated processing of the communication unit 310.

The storage unit 320 stores a basic program for operating the terminal, an application program, and data, such as configuration information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. In addition, control unit 330 records and reads data in and from the storage unit 320. The control unit 330 may execute functions of a protocol stack required by a communication standard. For doing so, the control unit 330 may include at least one processor or microprocessor, or may be part of a processor. Part of the communication unit 310 and the control unit 330 may be referred to as a communication processor (CP). According to various embodiments of the disclosure, the control unit 330 may control the terminal to carry out operations, to be explained, according to various embodiments.

Figure 4A:
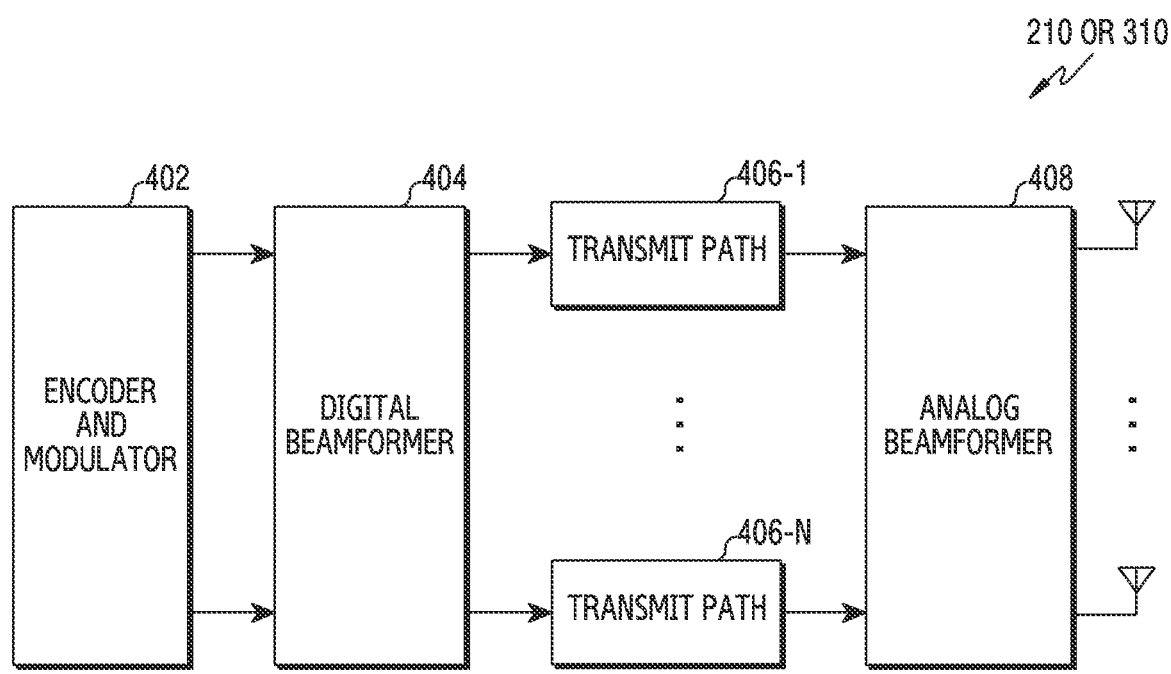
FIG. 4A illustrates a configuration of a communication unit in a wireless communication system according to an embodiment of the disclosure.
Figure 4B:
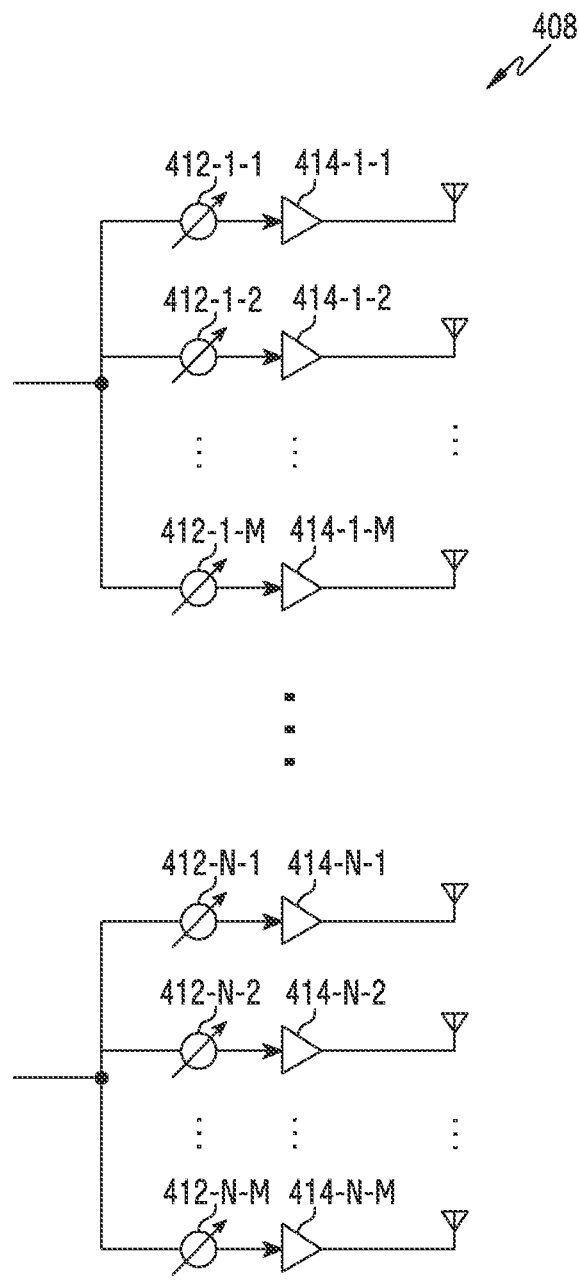
FIG. 4B illustrates a configuration of a communication unit in a wireless communication system according to an embodiment of the disclosure.
Figure 4C:
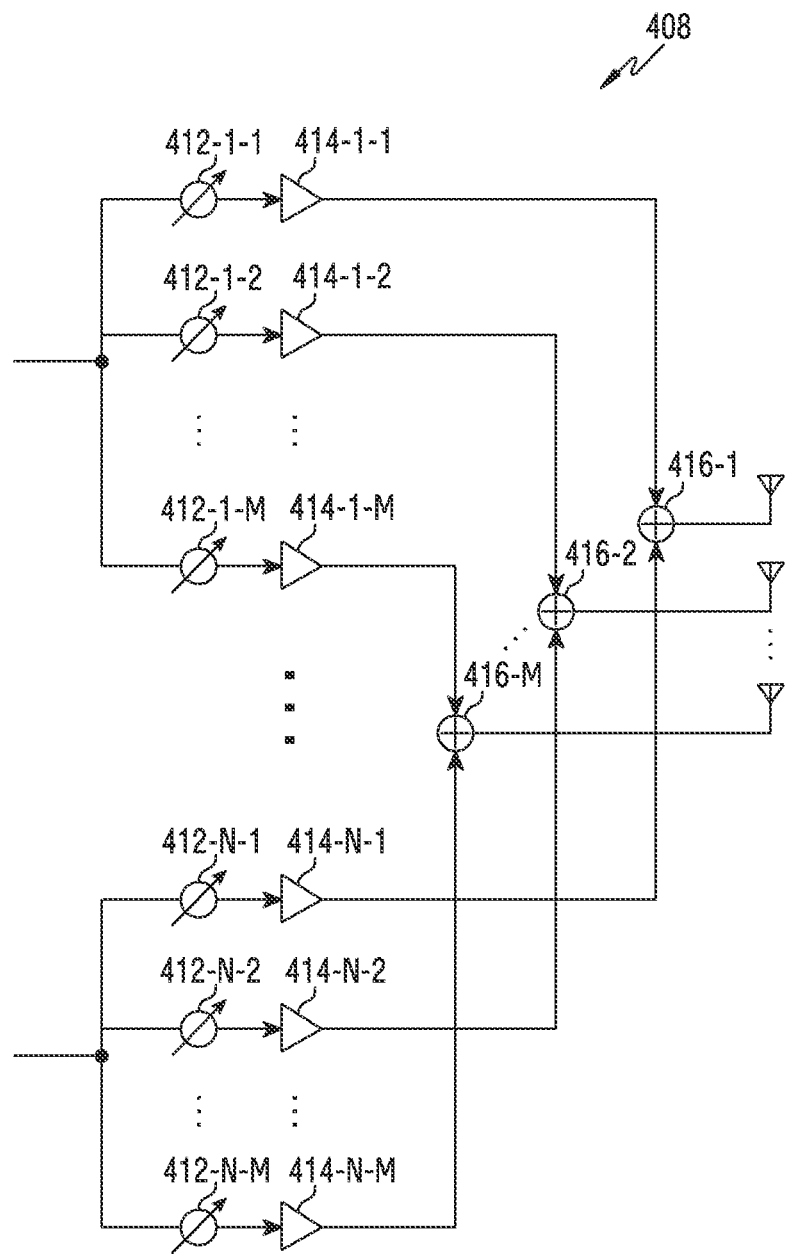
FIG. 4C illustrates a configuration of a communication unit in a wireless communication system according to an embodiment of the disclosure.

FIGS. 4A to 4C illustrate a configuration of a communication unit in a wireless communication system according to various embodiments of the disclosure. FIGS. 4A, 4B, and 4C depict a detailed configuration of the wireless communication unit 210 of FIG. 2A or the communication unit 310 of FIG. 3. More specifically, FIGS. 4A, 4B, and 4C depict components for performing the beamforming, as part of the wireless communication unit 210 of FIG. 2A or the communication unit 310 of FIG. 3.

Referring to FIG. 4A, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to change an amplitude and a phase of the signal, and may be referred to as a precoding matrix or a precoder. The digital beamformer 404 outputs the digital-beamformed modulation symbols to the transmit paths 406-1 through 406-N. In doing so, according to massive multiple-input multiple-output (MIMO) transmission, the modulation symbols may be multiplexed or the same modulation symbols may be fed to the transmit paths 406-1 through 406-N.

The transmit paths 406-1 through 406-N convert the digital-beamformed digital signals to analog signals. For doing, the transmit paths 406-1 through 406-N each may include an inverse fast fourier transform (IFFT) operator, a cyclic prefix (CP) adder, a DAC, and an up-converter. The CP adder is used for orthogonal frequency division multiplexing (OFDM), and may be excluded if another physical layer scheme (e.g., filter bank multi-carrier (FBMC)) is applied. For example, the transmit paths 406-1 through 406-N provide an independent signal process for a plurality of streams generated through the digital beamforming. Notably, depending on the implementation, some of the components of the transmit paths 406-1 through 406-N may be used in common.

The analog beamformer 408 beamforms the analog signals. For doing so, the digital beamformer 404 multiplies the analog signals by the beamforming weights. Herein, the beamforming weights are used to change the amplitude and the phase of the signal. More specifically, the analog beamformer 408 may be configured as shown in FIG. 4B or FIG. 4C, according to a connection structure between the transmit paths 406-1 through 406-N and the antennas.

Referring to FIG. 4B, signals inputted to the analog beamformer 408 are converted in phase/amplitude, amplified, and then transmitted via the antennas. In doing so, signals of each path are transmitted via different antenna sets, that is, antenna arrays. Signals inputted in a first path are converted by phase/amplitude converters 412-1-1 through 412-1-M to signal strings having different or the same phase/amplitude, amplified by amplifiers 414-1-1 through 414-1-M, and then transmitted via the antennas. In addition, signals inputted in a first path are converted by phase/amplitude converters 412-N-1 through 412-N-M to signal strings having different or the same phase/amplitude, amplified by amplifiers 414-N-1 through 414-N-M, and then transmitted via the antennas.

Referring to FIG. 4C, signals inputted to the analog beamformer 408 are converted in phase/amplitude, amplified, and then transmitted via antennas. In doing so, signals of each path are transmitted via the same antenna set, that is, the same antenna array. Signals inputted in the first path are converted by the phase/magnitude converters 412-1-1 through 412-1-M to signal strings having different or the same phase/amplitude, and amplified by the amplifiers 414-1-1 through 414-1-M. Next, to transmit via a single antenna array, the amplified signals are summed by adders 416-1-1 through 416-1-M based on the antenna element and then transmitted via the antennas.

The independent antenna array is used per transmit path in FIG. 4B, and the transmit paths share the single antenna array in FIG. 4C. However, according to another embodiment of the disclosure, some transmit paths may use the independent antenna array, and the rest transmit paths may share one antenna array. Further, according to yet another embodiment of the disclosure, by applying a switchable structure between the transmit paths and the antenna arrays, a structure which adaptively changes according to a situation may be used.

With advent of smart phones, use of a wireless communication network and a portable electronic device by the user is exponentially growing, and, to accomplish a higher data rate, a 5G communication system considers implementation at a super-high frequency (mmWave) band (e.g., a 60 GHz band). In order to obviate a path loss and to increase a delivery distance of propagation at the super-high frequency band, beamforming, MIMO, full dimensional MIMO (FD-MIMO), array antenna, analog beam-forming, and large scale antenna techniques are discussed in the 5G communication system.

Additionally, for an improvement in network of the system, the 5G communication system develops techniques, such as evolved small cell, advanced small cell, cloud radio access network (cloud RAN), ultra-dense network, device to device (D2D) communication, wireless backhaul, moving network, cooperative communication, coordinated multi-points (CoMP), and interference cancellation.

Besides, the 5G communication system is working on hybrid frequency shift keying (FSK) and quadrature amplitude modulation (QAM) modulation (FQAM) and sliding window superposition coding (SWSC) as advanced coding modulation (ACM), filter bank multi carrier (FBMC), non-orthogonal multiple access (NOMA), and sparse code multiple access (SCMA) as an advanced access technology.

Now, operations for improving terminal's performance are explained according to various embodiments of the disclosure, if beam performance degrades while a terminal and a base station transmit and receive information using multiple beams. Such beam performance degradation may be referred to as beam failure, and a process for recovering it may be referred to as BFR.

A radio resource control (RRC) connected terminal may perform wireless communication with the base station using one or more serving beams. Such a serving beam may be measured/observed and reported in association with channel state information (CSI)-reference signal (RS) or synchronization signal (SS) block (SSB).

If the CSI-RS based serving beam is used, the network may configure one or more (mapped to different beams) unique preambles and/or one or more contention free random access (RA) resources to the terminal for the sake of the serving BFR, and conduct signal transmission. Herein, such configuration information may be transmitted in a specific information element, for example, BFR config in a downlink RRC/media access control (MAC)/physical (PHY) signal provided from a specific network to the terminal. In doing so, the contention free RA resource may have beam association which is received at the base station using the same beam direction as the configured unique CSI-RS.

If the SSB based serving beam is used, the network may set one or more (mapped to different beams) unique preambles and/or one or more contention free RA resources to the terminal for the sake of the serving BFR, and conduct signal transmission. Herein, such configuration information may be transmitted in a specific information element, for example, in BFR Config in a downlink RRC/MAC/PHY signal provided from a specific network to the terminal. In doing so, each contention free RA resource may have the beam association which is received at the base station using the same beam direction as the configured unique SSB.

If a measured channel quality of any CSI-SS or SSB beams associated with the configured contention free RA resource does not exceed a specific threshold BFCandidateBeamThreshold which is preset by the network, the terminal may perform existing contention based RA using the contention based RA resource. If the measured channel quality of any CSI-SS or SSB beams associated with the configured contention free RA resource exceeds the specific threshold BFandidateBeamThreshold which is preset by the network, the terminal may perform the contention free RA by selecting resources as follows.

The terminal may conduct the contention free RA by selecting resources which may use beams of the best channel quality.

The terminal may conduct the contention free RA for K-ary resources by selecting the K-ary resources in order having the beam of the best channel quality. At this time, K may be a value included in a downlink signal (RRC/MAC/PHY) which is configured and provided by the network It is noted that the resources for the contention based RA and specific beams (e.g., SSBs) associated therewith may be different from the resources for the contention free RA and specific beams (e.g., CS-RSs) associated therewith. In this case, the terminal needs to measure only beams associated to the contention based RA resources and determine resources for transmitting the preamble for the contention based RA.

As a result, if not using the contention free RA for the BFR (e.g., if the measured beam quality falls below the threshold or the resource is not allocated), the terminal may not provide the network with proper beam information (CSI-RS identifier (ID) and the measurement value) due to the different beam association although the contention based RA is used. Notably, this may be addressed if the SSB associated with the contention based RA resource has a one-to-one relationship with a candidate CSI-RS which is considered by a specific terminal and it is known to both of the network and the terminal. However, this case may not occur frequently, and it should be noted that, if the contention based RA resource based on the SSB and the contention free RA resource based on the CSI-RS exist together, the correlation between the resources and the beams may be a many-to-one relationship (many CSI-RSs to one SSB, or one CSI-RS to many SSBs), in addition to the one-to-one.

Hence, if using the contention based RA, the terminal requires a method for providing accurate candidate beam information to the network. For doing so, the terminal may include its terminal information (e.g., C-RNTI) and beam information (e.g., CSI-RS ID, CSI-RS measurement) in an uplink message (e.g., Msg3) transmitted from the terminal, in response to a downlink RA preamble response message of the network in the RA procedure. Now, the disclosure provides embodiments for transmitting such information and embodiments for prioritizing a logical channel.

Figure 5:
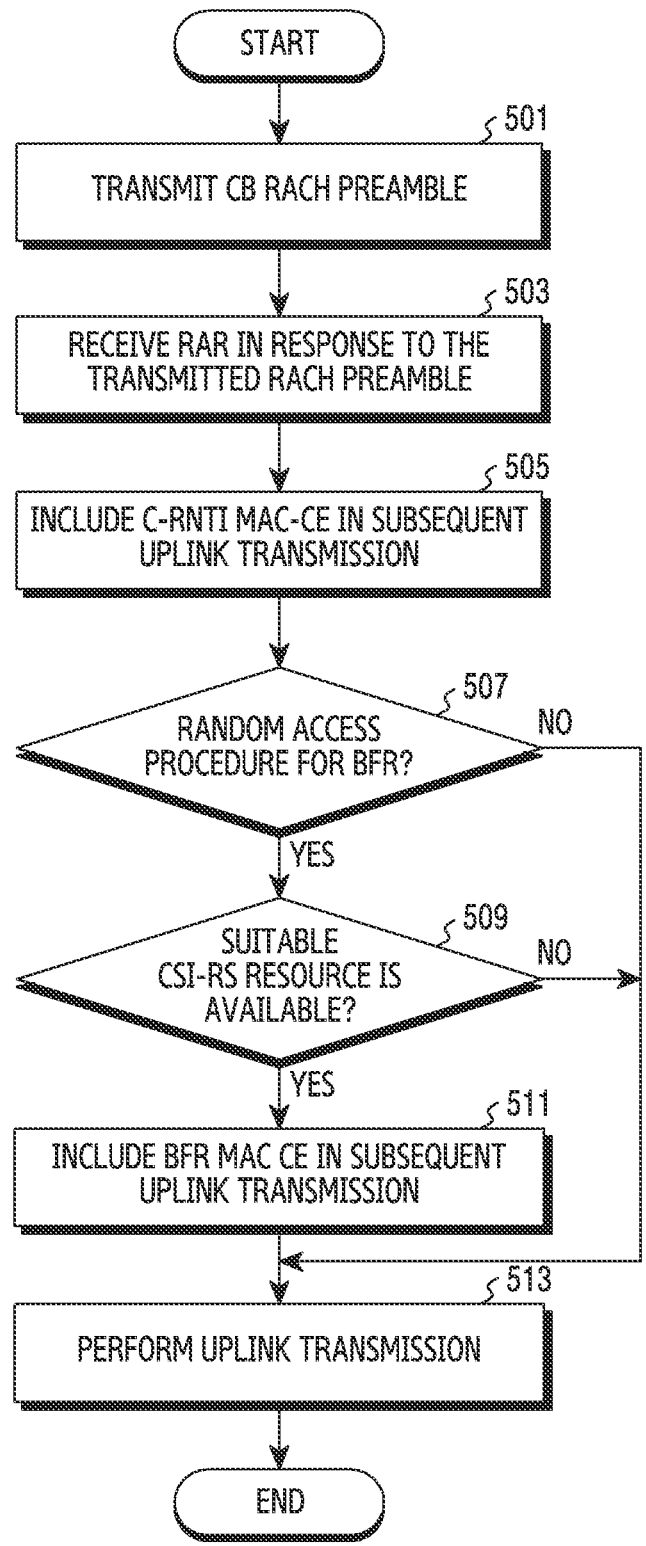
FIG. 5 illustrates a flowchart of a terminal for performing a random access (RA) procedure in a wireless communication system according to an embodiment of the disclosure.

FIG. 5 illustrates a flowchart of a terminal for performing a RA procedure in a wireless communication system according to an embodiment of the disclosure. FIG. 5 illustrates an operating method of the terminal 120.

Referring to FIG. 5, in operation 501 the terminal may transmit a contention based RA channel (CB RACH) preamble. In operation 503, the terminal may receive a RA response (RAR) in response to the transmitted preamble. In operation 505, the terminal may include a C-RNTI MAC-CE in a message to transmit (e.g., Msg3) using an uplink resource designated by the RAR. In operation 507, the terminal determines whether the ongoing CB RACH transmission is initiated by the BFR. If the CB RACH transmission is initiated by the BFR, the terminal determines whether there is available (having a measurement value over a specific threshold) CSI-RS resource in operation 509. For example, the terminal determines that the ongoing CB RACH transmission is initiated by the BFR, and determines whether a suitable CSI-RS resource is available. If the CB RACH transmission is initiated by the BFR and the CSI-RS resource is available, the terminal includes a BFR MAC-CE including an ID of the CSI-RS resource in a subsequent uplink transmission in operation 511. For example, the terminal may include the BFR MAC-CE including the ID of the CSI-RS resource in a Msg3 to transmit. In operation 513, the terminal performs the uplink transmission. For example, the terminal may transmit the Msg3 using the resource allocated from the RAR.

In the embodiment of FIG. 5, the Msg3 may have a structure of FIG. 6, including the C-RNTI MAC-CE and the BFR MAC-CE including the ID of the CSI-RS resource.

FIG. 6 illustrates a Msg3 structure in a wireless communication system according to an embodiment of the disclosure.

Referring to FIG. 6, the Msg3 may include a MAC subheader 602, a C-RNTI MAC CE 604, a MAC subheader 606, and a BFR MAC CE 608. At this time, logical channel prioritization for generating such a MAC CE may be defined as shown in FIG. 7.

Figure 7:
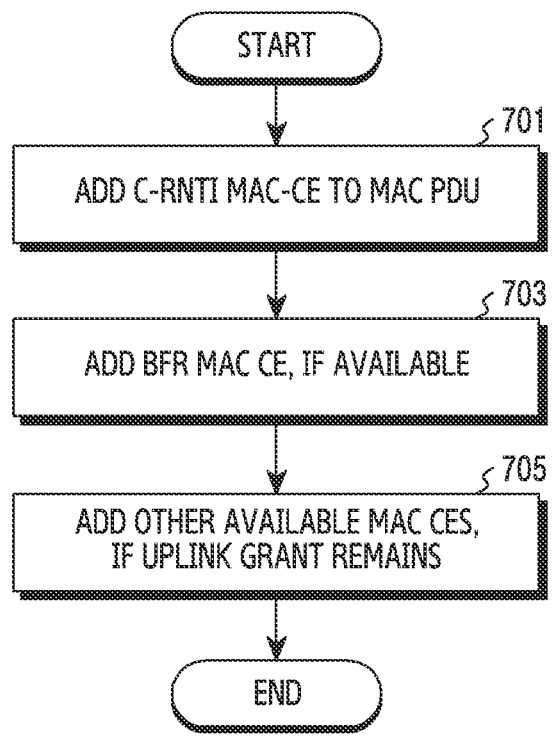
FIG. 7 illustrates a flowchart of a terminal for generating a media access control (MAC) control element (CE) in a wireless communication system according to an embodiment of the disclosure.

FIG. 7 illustrates a flowchart of a terminal for generating a MAC CE in a wireless communication system according to an embodiment of the disclosure.

Referring to FIG. 7, in operation 701 the terminal first adds a C-RNTI MAC-CE. In operation 703, the terminal, if available, adds a BFR MAC CE. In operation 705, the terminal adds other MAC CEs, if uplink grant remains. In other words, if capacity remains, the terminal may add other MAC-CEs.

Figure 8:
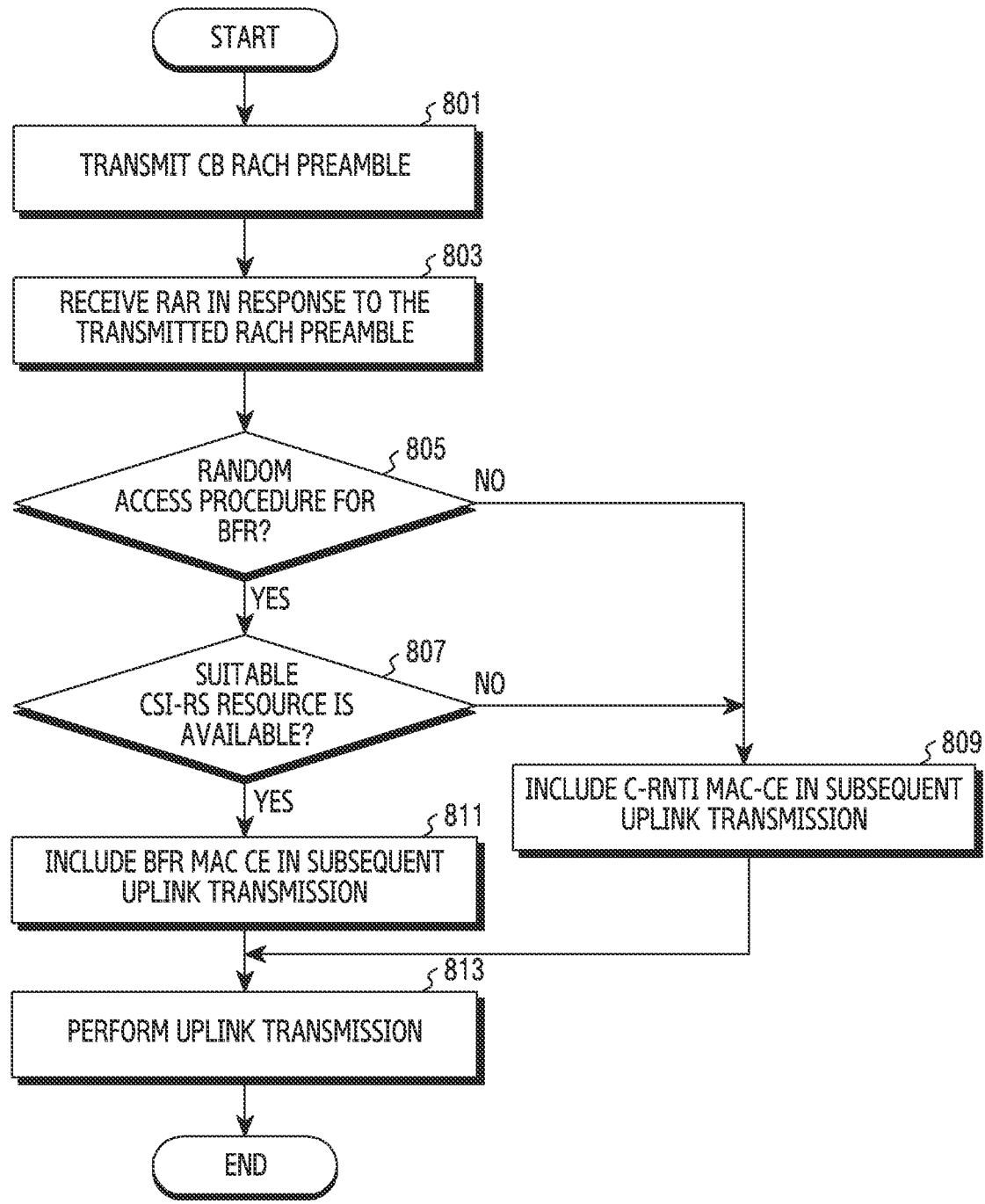
FIG. 8 illustrates a flowchart of a terminal for performing a RA procedure in a wireless communication system according to an embodiment of the disclosure.

FIG. 8 illustrates a flowchart of a terminal for performing a RA procedure in a wireless communication system according to an embodiment of the disclosure. FIG. 8 illustrates an operating method of the terminal 120.

Referring to FIG. 8, in operation 801 the terminal may transmit a CB RACH preamble. In operation 803, the terminal may receive an RAR in response to the transmitted preamble. Next, the terminal may include a specific MAC-CE in a Msg3 to transmit using an uplink resource designated by the RAR. For doing so, the terminal determines whether the ongoing CB RACH transmission is initiated by the BFR in operation 805. If the CB RACH transmission is initiated by the BFR, the terminal determines whether there is available (having a measurement value over a specific threshold) CSI-RS resource in operation 807. For example, the terminal determines whether the ongoing CB RACH transmission is initiated by the BFR, and determines whether a suitable CSI-RS resource is available.

If the CB RACH transmission is not initiated by the BFR or the CSI-RS resource is not available, the terminal includes a C-RNTI MAC-CE in the uplink transmission in operation 809. By contrast, if the CB RACH transmission is initiated by the BFR or the CSI-RS resource is available, the terminal includes a BFR MAC-CE including the ID of the CSI-RS resource in the uplink transmission in operation 811. In operation 813, the terminal performs the uplink transmission. For example, the terminal may transmit a Msg3 using the resource allocated from the RAR.

Figure 9:
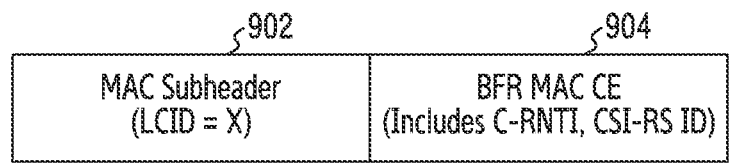
FIG. 9 illustrates a beam failure recovery (BFR) MAC-CE structure included in a Msg3 in a wireless communication system according to an embodiment of the disclosure.

In the embodiment of FIG. 8, if all the conditions are satisfied, that is, in operation 811, the BFR MAC-CE included in the Msg3 may be defined as shown in FIG. 9.

FIG. 9 illustrates a BFR MAC-CE structure included in a Msg3 in a wireless communication system according to an embodiment of the disclosure.

Referring to FIG. 9, the MAC-CE may include a MAC subheader 902 and a BFR MAC CE 904.

Figure 10:
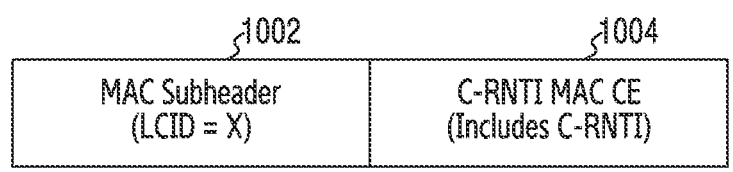
FIG. 10 illustrates a cell-radio network temporary identifier (ID) (C-RNTI) MAC-CE structure included in a Msg3 in a wireless communication system according to an embodiment of the disclosure.

In the embodiment of FIG. 8, if at least one condition is not satisfied, that is, in operation 809, the C-RNTI MAC-CE included in the Msg3 may be defined as shown in FIG. 10.

FIG. 10 illustrates a C-RNTI MAC-CE structure included in a Msg3 in a wireless communication system according to an embodiment of the disclosure.

Referring to FIG. 10, the MAC-CE may include a MAC subheader 1002 and a C-RNTI MAC CE 1004.

Figure 11:
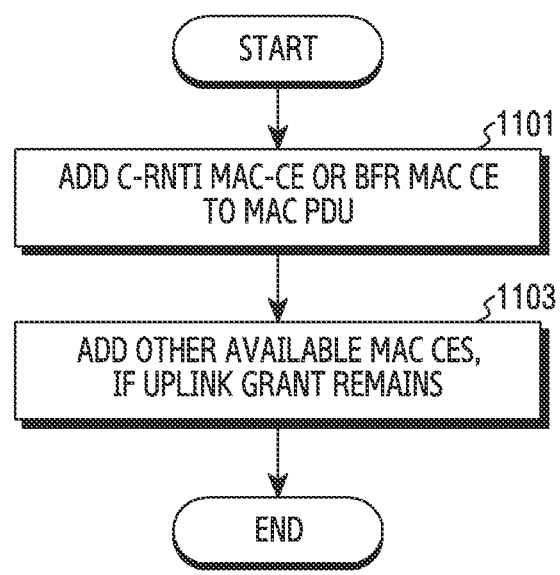
FIG. 11 illustrates a flowchart of a terminal for generating a MAC CE in a wireless communication system according to an embodiment of the disclosure.

Logical channel prioritization for generating such a MAC CE may be defined as shown in FIG. 11.

FIG. 11 illustrates a flowchart of a terminal for generating a MAC CE in a wireless communication system according to an embodiment of the disclosure.

Referring to FIG. 11, in operation 1101 the terminal first adds one of a C-RNTI MAC-CE or a BFR MAC-CE according to a condition. In operation 1103, if uplink grant remains, the terminal adds other MAC CEs. In other words, if capacity remains, the terminal may add other MAC-CEs.

Figure 12:
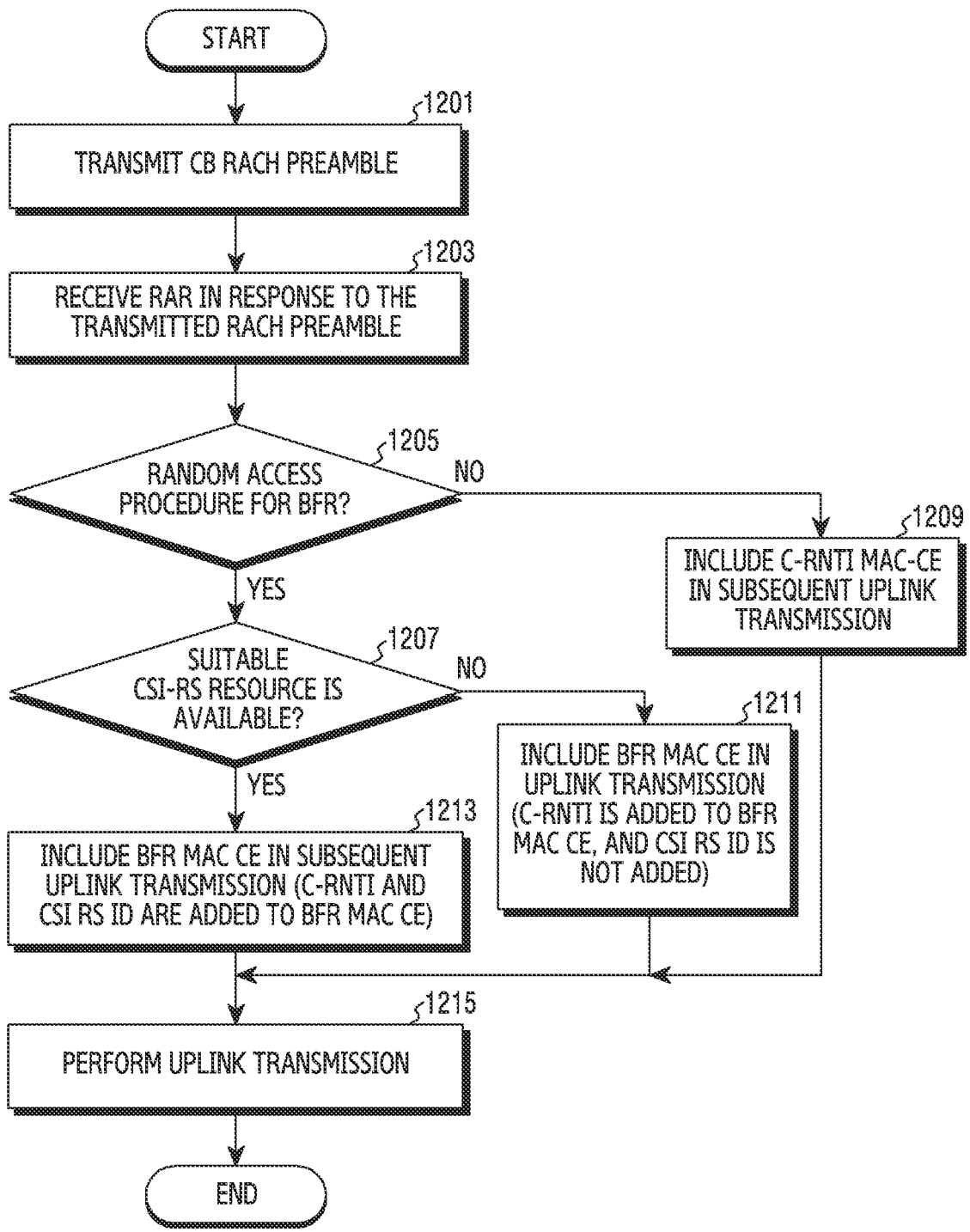
FIG. 12 illustrates a flowchart of a terminal for performing a RA procedure in a wireless communication system according to an embodiment of the disclosure.

FIG. 12 illustrates a flowchart of a terminal for performing a RA procedure in a wireless communication system according to an embodiment of the disclosure. FIG. 12 illustrates an operating method of the terminal 120.

Referring to FIG. 12, in operation 1201 the terminal may transmit a CB RACH preamble. In operation 1203, the terminal may receive an RAR in response to the transmitted preamble. Next, the terminal may include a specific MAC-CE in a Msg3 to transmit using an uplink resource designated by the RAR. For doing so, the terminal determines whether the ongoing CB RACH transmission is initiated by the BFR in operation 1205. If the CB RACH transmission is initiated by the BFR, the terminal determines whether there is available (having a measurement value over a specific threshold) CSI-RS resource in operation 1207. For example, the terminal determines whether the ongoing CB RACH transmission is initiated by the BFR, and determines whether a suitable CSI-RS resource is available.

If the CB RACH transmission is not initiated by the BFR, the terminal includes a C-RNTI MAC-CE in uplink transmission in operation 1209. For example, the terminal may add the C-RNTI MAC-CE in the Msg3.

If the ongoing CB RACH transmission is initiated by the BFR and no CSI-RS resource is available (having the measurement value over the threshold), the terminal includes a BFR MAC-CE including C-RNTI without CSI-RS information to transmit, in the uplink transmission in operation 1211. For example, the terminal may include the BFR MAC-CE including only the C-RNTI without the CSI-RS information, in the Msg3.

If the ongoing CB RACH transmission is initiated by the BFR and the CSI-RS resource is available (having the measurement value over the threshold), the terminal includes a BFR MAC-CE including both of the CSI-RS information and the C-RNTI, in the uplink transmission in operation 1213. For example, the terminal may include the BFR MAC-CE including both of the CSI-RS information and the C-RNTI, in the Msg3.

In operation 1215, the terminal performs the uplink transmission. For example, the terminal may transmit the Msg3 using a resource allocated from the RAR.

In the embodiment of FIG. 12, the BFR MAC-CE included in the Msg3 while transmitting the RACH due to the BFR may be defined as shown in FIG. 13.

FIG. 13 illustrates a BFR MAC-CE structure included in a Msg3 in a wireless communication system according to an embodiment of the disclosure.

Referring to FIG. 13, the Msg3 may include a MAC subheader 1302 and a BFR MAC-CE 1304. Herein, the Msg3 may include a 1-bit indicator which indicates whether the corresponding BFR MAC-CE includes the CSI-RS information (e.g., ID).

Figure 14:
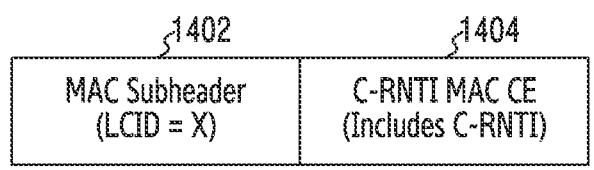
FIG. 14 illustrates an RNTI MAC-CE structure included in a Msg3 in a wireless communication system according to an embodiment of the disclosure.

In the embodiment of FIG. 12, if any condition is not satisfied, that is, in operation 1209, the C-RNTI MAC-CE included in the Msg3 may be defined as shown in FIG. 14.

FIG. 14 illustrates a C-RNTI MAC-CE structure included in a Msg3 in a wireless communication system according to an embodiment of the disclosure.

Referring to FIG. 14, the Msg3 may include a MAC subheader 1402 and a C-RNTI MAC CE 1404.

Figure 15:
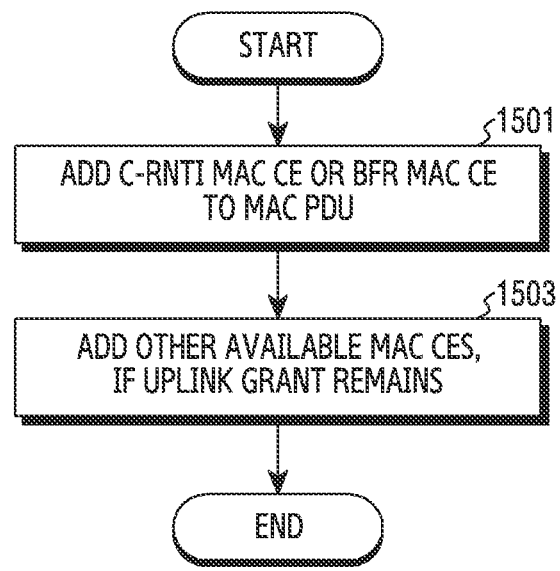
FIG. 15 illustrates a flowchart of a terminal for generating a MAC CE in a wireless communication system according to an embodiment of the disclosure.

At this time, the logical channel prioritization for generating such a MAC CE may be defined as shown in FIG. 15.

FIG. 15 illustrates a flowchart of a terminal for generating a MAC CE in a wireless communication system according to an embodiment of the disclosure.

Referring to FIG. 15, in operation 1501 the terminal first adds one of a C-RNTI MAC-CE or a BFR MAC-CE according to a condition. In operation 1503, if uplink grant remains, the terminal adds other MAC CEs. In other words, if capacity remains, the terminal may add other MAC-CEs.

Figure 16:
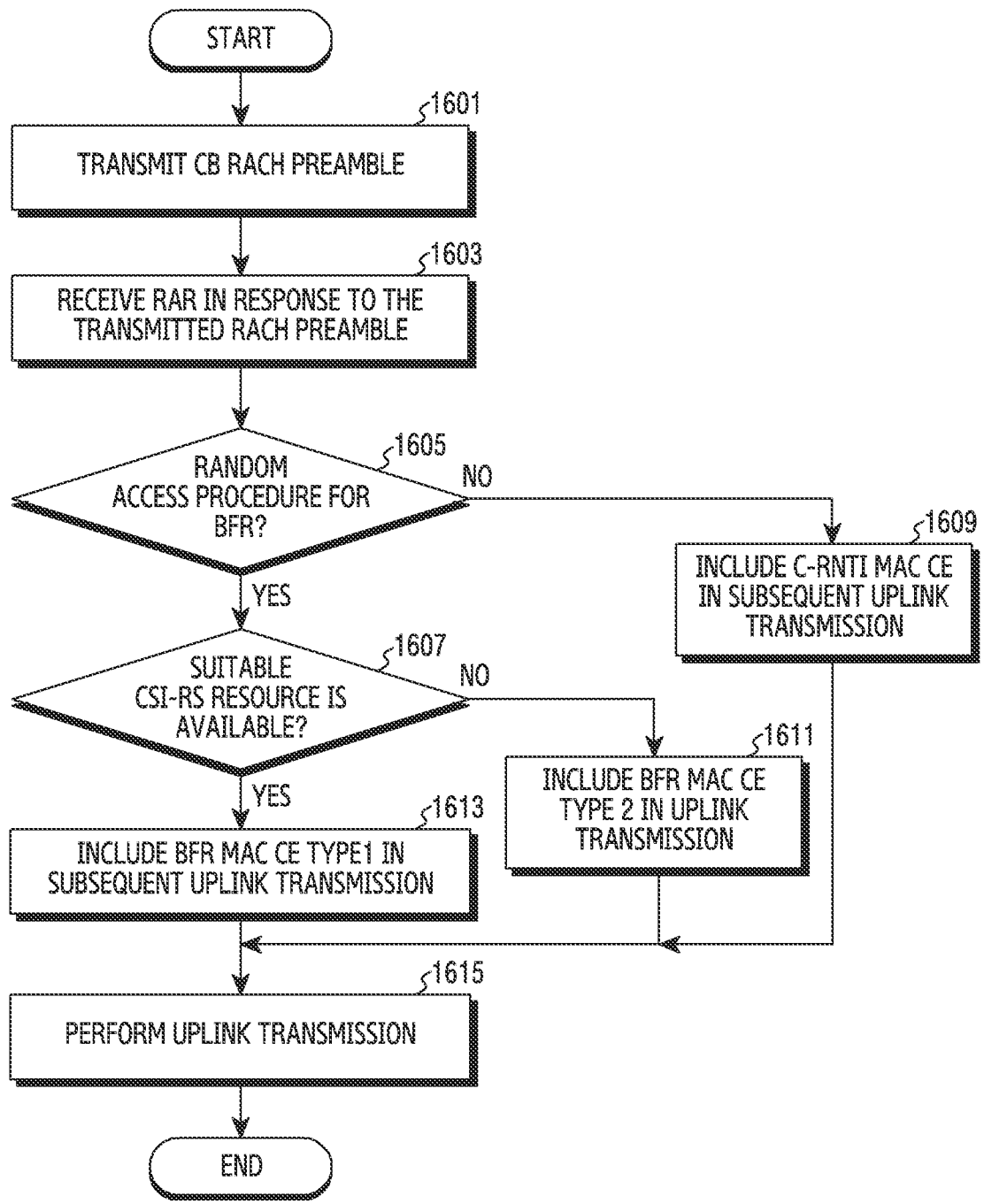
FIG. 16 illustrates a flowchart of a terminal for performing a RA procedure in a wireless communication system according to an embodiment of the disclosure.

FIG. 16 illustrates a flowchart of a terminal for performing a RA procedure in a wireless communication system according to an embodiment of the disclosure. FIG. 16 illustrates an operating method of the terminal 120.

Referring to FIG. 16, in operation 1601 the terminal may transmit a CB RACH preamble. In operation 1603, the terminal may receive an RAR in response to the transmitted preamble. Next, the terminal may include a specific MAC-CE in a Msg3 to transmit using an uplink resource designated by the RAR. For doing so, the terminal determines whether the ongoing CB RACH transmission is initiated by the BFR in operation 1605. If the CB RACH transmission is initiated by the BFR, the terminal determines whether there is available (having a measurement value over a specific threshold) CSI-RS resource in operation 1607. For example, the terminal determines whether the ongoing CB RACH transmission is initiated by the BFR, and a suitable CSI-RS resource is available.

If the CB RACH transmission is not initiated by the BFR, the terminal includes a C-RNTI MAC-CE in uplink transmission in operation 1609. For example, the terminal may include the C-RNTI MAC-CE in the Msg3.

If the ongoing CB RACH transmission is initiated by the BFR and no CSI-RS resource is available (having the measurement value over the threshold), the terminal includes a Type2 BFR MAC-CE in the uplink transmission in operation 1611. For example, the terminal may include the Type2 BFR MAC-CE in the Msg3 to transmit.

If the CB RACH transmission conducted again is initiated by the BFR and the CSI-RS resource is available (having the measurement value over the threshold), the terminal includes a Type1 BFR MAC-CE in the uplink transmission in operation 1613. For example, the terminal may include the Type1 BFR MAC-CE in the Msg3.

In operation 1615, the terminal performs the uplink transmission. For example, the terminal may transmit the Msg3 using a resource allocated from the RAR.

Figure 17:
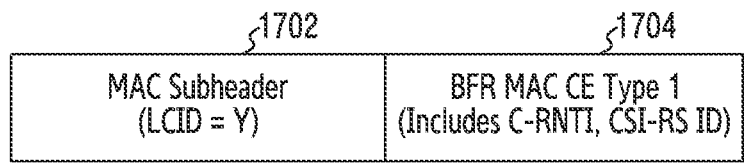
FIG. 17 illustrates a type1 BFR MAC-CE structure included in a Msg3 in a wireless communication system according to an embodiment of the disclosure.

In the embodiment of FIG. 16, the Type1 BFR MAC-CE included in the Msg3 while transmitting the RACH may be defined as shown in FIG. 17.

FIG. 17 illustrates a Type1 BFR MAC-CE structure included in a Msg3 in a wireless communication system according to an embodiment of the disclosure.

Referring to FIG. 17, the Msg3 may include a MAC subheader 1702 and a Type1 BFR MAC CE 1704. Herein, the corresponding BFR MAC-CE may include CSI-RS information (e.g., ID) and a C-RNTI.

Figure 18:
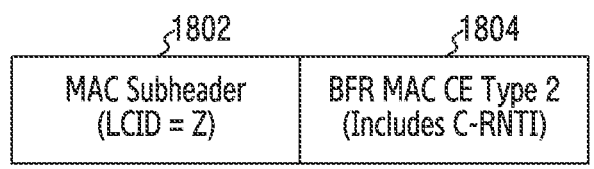
FIG. 18 illustrates a type2 BFR MAC-CE structure included in a Msg3 in a wireless communication system according to an embodiment of the disclosure.

In the embodiment of FIG. 16, the Type2 BFR MAC-CE included in the Msg3 while transmitting the RACH may be defined as shown in FIG. 18.

FIG. 18 illustrates a Type2 BFR MAC-CE structure included in a Msg3 in a wireless communication system according to an embodiment of the disclosure.

Referring to FIG. 18, the corresponding BFR MAC-CE may not include CSI-RS information (e.g., ID), but include a C-RNTI. The Msg3 may include a MAC subheader 1802 and a Type2 BFR MAC CE 1804. Herein, the corresponding BFR MAC-CE may include CSI-RS information (e.g., ID) and a C-RNTI.

Figure 19:
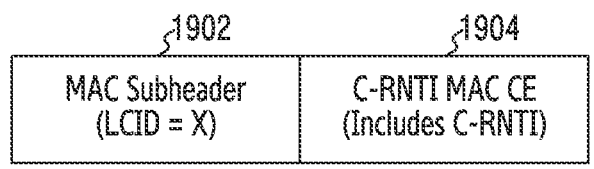
FIG. 19 illustrates a C-RNTI MAC-CE structure included in a Msg3 in a wireless communication system according to an embodiment of the disclosure.

In the embodiment of FIG. 16, if any condition is not satisfied, that is, in operation 1609, the C-RNTI MAC-CE included in the Msg3 may be defined as shown in FIG. 19.

FIG. 19 illustrates a C-RNTI MAC-CE structure included in a Msg3 in a wireless communication system according to an embodiment of the disclosure.

Referring to FIG. 19, the Msg3 may include a MAC subheader 1902 and a C-RNTI MAC CE 1904.

Figure 20:
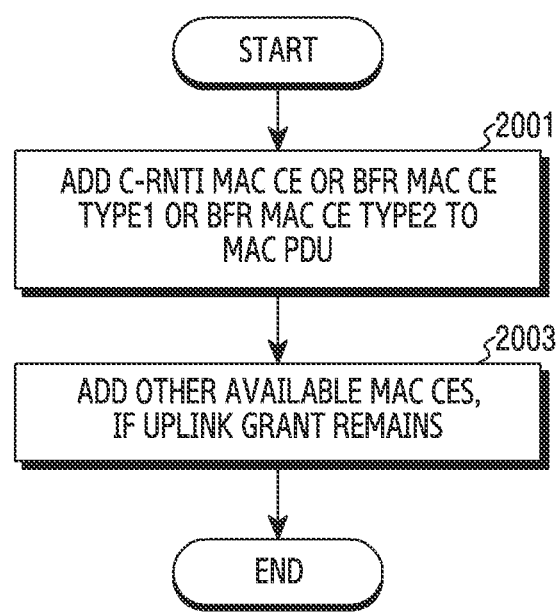
FIG. 20 illustrates a flowchart of a terminal for generating a MAC CE in a wireless communication system according to an embodiment of the disclosure.

At this time, the logical channel prioritization for generating such a MAC CE may be defined as shown in FIG. 20.

FIG. 20 illustrates a flowchart of a terminal for generating a MAC CE in a wireless communication system according to an embodiment of the disclosure.

Referring to FIG. 20, in operation 2001 the terminal first adds one of a BFR MAC-CE Type1 or a BFR MAC-CE Type2 according to a condition. In operation 2003, if uplink grant remains, the terminal adds other MAC CEs. In other words, if capacity remains, the terminal may add other MAC-CEs.

According to embodiments as described above, the terminal may transmit the message including the BFR related information during the RA procedure. In response, the base station may receive the message including the BFR related information. From the message including the BFR related information, the base station may obtain the BFR related information and perform the BFR procedure.

According to other embodiment of the disclosure, the network may deliver specific timer information to the terminal in advance using a downlink signal (e.g., RRC signal, MAC signal, PHY signal, and the like). Hence, the terminal may determine whether to perform the BFR.

The timer may initiate if the terminal detects a beam failure problem

The detection of the beam failure problem may be recognized if one or more indications/incidents occur within a specific time at the MAC/PHY/RRC.

The terminal may scan a new candidate beam before the timer expires.

If the new candidate beam is scanned before the time expires, BFR attempt may be performed.

Alternatively, even if the new candidate beam is scanned before the time expires, the terminal does not perform any BFR attempt, for example, the contention free RA and/or the contention based RA, and may scan a better beam for a defined time.

If the new candidate beam is not scanned before the time expires, the terminal does not perform any BFR attempt, for example, the contention free RA and/or the contention based RA.

If the timer expires, the terminal may operate as follows.

If the new candidate beam is scanned before the time expires, the terminal may perform the contention free RA or the contention based RA using the new beam as stated above.

If the new candidate beam is not scanned before the time expires, the terminal may terminate every BFR attempt, initialize related parameters, and terminate related operations.

Alternatively, if the new candidate beam is not scanned before the time expires, the terminal may terminate every BFR attempt, declare radio link failure (RLF), and initiate a cell reselection procedure.

Now, embodiments relating to discontinuous receive (DRX) operation paging occasion (PO) configuration are explained.

During the DRX operation, the terminal may monitor one PO per DRX cycle. To determine such a PO, a rule for determining a frame to be used as a reference (hereinafter a 'reference frame') and the PO is required. The disclosure provides embodiments for defining the rule based on the number of SSBs and control resource set (CORESET) configuration information.

The reference frame may be determined based on Equation 1.

$$(SFN+\text{offset})\bmod T = (T \text{ div } N)*(UE\_ID \bmod N) \text{ Offset: } 0 \text{ for } nB >= T; 0 \ldots 1 \text{ for } nB = T/2; 0 \ldots 3 \text{ for } nB = T/4; 0 \ldots 7 \text{ for } nB = T/8; \text{ and } 0 \ldots 15 \text{ for } nB = T/16;$$

Equation 1

In Equation 1, SFN denotes a system frame number, offset denotes an offset for the reference frame, T denotes the DRX cycle of the terminal, N denotes a minimum value among T and nB, UE_ID denotes identification information of the terminal, and nB denotes a parameter configured by system information.

At least one of the parameters may be configured by the system information. For example, T may be determined to a smaller value among a terminal unique DRX value and a default DRX value which is broadcasted as the system information, if an upper layer grants. If the terminal unique DRX value is not configured, the terminal may determine T to the default DRX value which is broadcasted as the system information. UE_ID may be defined as 'international mobile subscriber identify (IMSI) mod 1024'.

The terminal may determine an index i_s based on Equation 2.

$$i\_s = \text{floor}(UE\_ID/N)\bmod Ns \; Ns = \max(1, nB/T); N:\min(T, nB)$$

Equation 2

In Equation 2, i_s denotes the index for indicating the PO to be monitored by the terminal, UE_ID denotes the identification information of the terminal, N denotes the minimum value among T and nB, T denotes the DRX cycle of the terminal, and nB denotes the parameter configured by the system information.

For example, if i_s is 0, the terminal monitors a first PO. If i_s is 1, the terminal monitors a second PO. If i_s is 2, the terminal monitors a third PO. If i_s is 3, the terminal monitors a fourth PO.

The network may configure and broadcast a paging search space including monitoring-periodicity-physical downlink control channel (PDCCH)-slot, Monitoring-offset-PDCCH-slot, and Monitoring-symbols-PDCCH-within-slot, in the system information. The terminal determines a PDCCH monitoring occasion based on Monitoring-periodicity-PDCCH-slot, Monitoring-offset-PDCCH-slot, and Monitoring-symbols-PDCCH-within-slot of the slot.

If Equation 3 is satisfied, the PDCCH monitoring occasion exists in a slot X in a radio frame Y.

$$(y*(\text{number of slots in } a \text{ radio frame})+x-\text{Monitoring-offset-PDCCH-slot})\bmod(\text{Monitoring-periodicity-PDCCH-slot})=0$$

Equation 3

In Equation 3, y denotes a radio frame number including the PDCCH monitoring occasion, x denotes a slot number including the PDCCH monitoring occasion, Monitoring—offset—PDCCH—slot denotes an offset for the PDCCH monitoring, and Monitoring—periodicity—PDCCH—slot denotes a period for the PDCCH monitoring.

A start symbol of the PDCCH monitoring occasion of the slot X is given as Monitoring-symbols-PDCCH-within-slot. A length (e.g., a symbol unit) of the PDCCH monitoring occasion may be given in CORESET in association with the search space.

According to such paging search space configuration, the terminal determines a first PDCCH monitoring occasion. Herein, the PDCCH monitoring occasions are sequentially numbered the index from zero (0) within a corresponding reference frame. The first PO (e.g., the PO corresponding to i_s=0) are 0-th through S−1-th PDCCH monitoring occasions, where S denotes the number of SSBs. The second PO (e.g., the PO corresponding to i_s=1) are S-th through 2S−1-th PDCCH monitoring occasions. The third PO (e.g., the PO corresponding to i_s=2) are 2S-th through 3S−1-th PDCCH monitoring occasions. The index is numbered as stated above.

Figure 21:
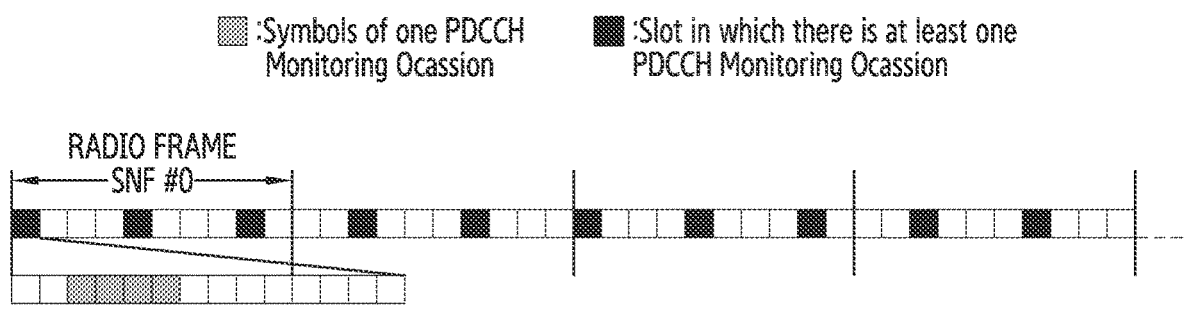
FIG. 21 illustrates a configuration of a physical downlink control channel (PDCCH) monitoring occasion in a wireless communication system according to an embodiment of the disclosure.
Figure 22:
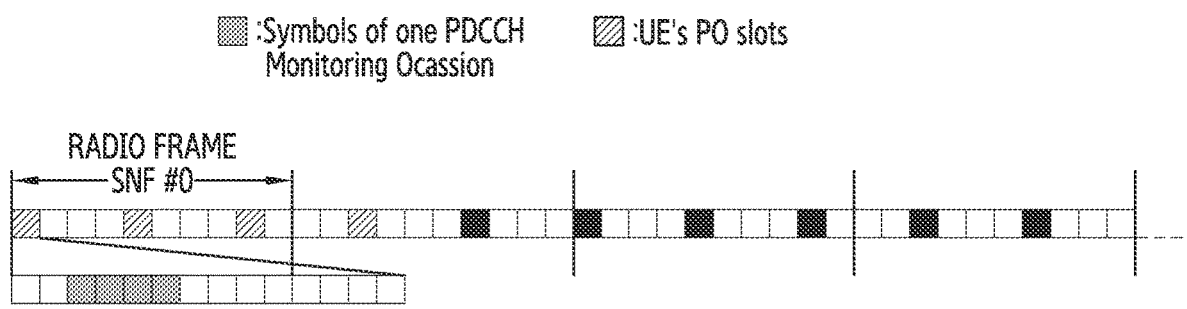
FIG. 22 illustrates a paging occasion (PO) monitored by a terminal in a wireless communication system according to an embodiment of the disclosure.

FIG. 21 illustrates a configuration of a PDCCH monitoring occasion in a wireless communication system according to an embodiment of the disclosure. FIG. 22 illustrates a paging occasion (PO) monitored by a terminal in a wireless communication system according to an embodiment of the disclosure.

Referring to FIGS. 21 and 22, monitoring-periodicity-PDCCH-slot is 4, Monitoring-offset-PDCCH-slot is 0, Monitoring-symbols-PDCCH-within-slot is 010000000000000, and PDCCH CORESET Length in symbols is 4.

Referring to FIGS. 21 and 22, the reference frame determined by the base station is SFN #0, and the determined i_s is 0. In addition, the number of SSBs is 4 (i.e., S=4). In this case, a first PDCCH monitoring occasion ranges from symbols 3 to 5 in the slot 0. A next PDCCH monitoring occasion ranges from symbols 2 to 5 in a slot 4. Similarly, subsequent PDCCH monitoring occasions may be determined. Since the index i_s of the terminal is 0, the terminal observes the first PO including the PDCCH monitoring occasions 0, 1, 2, and 3 as shown in FIG. 22. In brief, the PDCCH monitoring occasions may be defined as shown in Table 1.

TABLE 1

| |
| --- |
| PDCCH monitor occasion 0 = SFN 0, slot 0, symbols 2 to 5 |
| PDCCH monitor occasion 1 = SFN 0, slot 4, symbols 2 to 5 |
| PDCCH monitor occasion 2 = SFN 0, slot 8, symbols 2 to 5 |
| PDCCH monitor occasion 3 = SFN 1, slot 2, symbols 2 to 5 |

Figure 23:
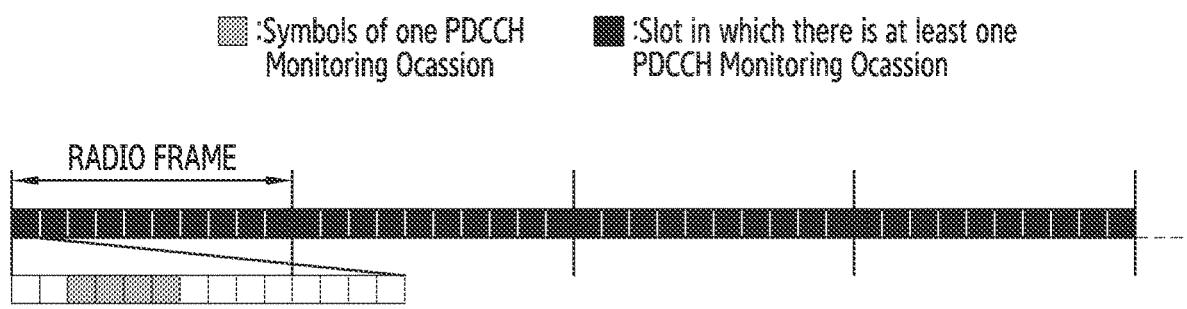
FIG. 23 illustrates a configuration of a PDCCH monitoring occasion in a wireless communication system according to an embodiment of the disclosure.
Figure 24:
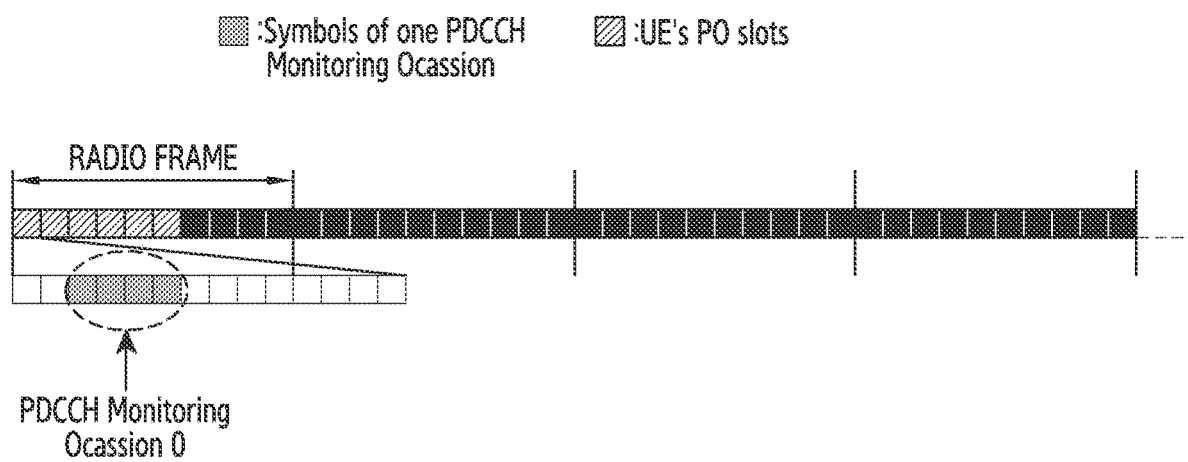
FIG. 24 illustrates a PO monitored by a terminal in a wireless communication system according to an embodiment of the disclosure.

FIG. 23 illustrates a configuration of a PDCCH monitoring occasion in a wireless communication system according to an embodiment of the disclosure. FIG. 24 illustrates a PO monitored by a terminal in a wireless communication system according to an embodiment of the disclosure.

Referring to FIGS. 23 and 24, as another example of the paging searching configuration, Monitoring-periodicity-PDCCH-slot is 1, Monitoring-offset-PDCCH-slot is 0, Monitoring-symbols-PDCCH-within-slot is 01000000000000, and PDCCH CORESET Length in symbols is 4.

In the embodiment of FIG. 23, the reference frame determined by the base station is SFN #0, and the determined $i\_s$ is 0. In addition, the number of SSBs is 6 (i.e., S=6). In this case, a first PDCCH monitoring occasion ranges from symbols 2 to 5 in a slot 0. A next PDCCH monitoring occasion ranges from symbols 2 to 5 in a slot 1. Similarly, subsequent PDCCH monitoring occasions may be determined. Since the index $i\_s$ of the terminal is 0, the terminal observes the first PO including the PDCCH monitoring occasions 0, 1, 2, 3, 4, and 5 as shown in FIG. 24. In brief, the PDCCH monitoring occasions may be defined as shown in Table 2.

TABLE 2

| |
| --- |
| PDCCH monitor occasion 0 = SFN 0, slot 0, symbols 2 to 5 |
| PDCCH monitor occasion 1 = SFN 0, slot 1, symbols 2 to 5 |
| PDCCH monitor occasion 2 = SFN 0, slot 2, symbols 2 to 5 |
| PDCCH monitor occasion 3 = SFN 0, slot 3, symbols 2 to 5 |
| PDCCH monitor occasion 4 = SFN 0, slot 4, symbols 2 to 5 |
| PDCCH monitor occasion 5 = SFN 0, slot 5, symbols 2 to 5 |

Table 3 shows examples of the PO based on values of $i\_s$ and Ns

TABLE 3

| Ns | $i\_s = 0$ | $i\_s = 1$ | $i\_s = 2$ | $i\_s = 3$ |
| --- | --- | --- | --- | --- |
| 1 | 1st PO i.e., 0 to S-1th PDCCH monitoring occasions. | N/A | N/A | N/A |
| 2 | 1st PO i.e., 0 to S-1th PDCCH monitoring occasions | 2nd PO i.e., S to 2S-1th PDCCH monitoring occasions | N/A | N/A |
| 3 | 1st PO i.e., 0 to S-1th PDCCH monitoring occasions | 2nd PO i.e., S to 2S-1th PDCCH monitoring occasions | 3rd PO i.e., 2S to 3S-1th PDCCH monitoring occasions | 2nd PO i.e., 3 to 4S-1th PDCCH monitoring occasions |

Now, embodiments for including information of on-demand system information reception in the system information are described. Hereafter, a resource allocation method for requesting the on-demand system information, to be recognized by the terminal to receive the on-demand system information, is explained.

The terminal may request the on-demand system information from the network using the contention based or content free RA. The disclosure provides more general contention free terminal operations, and an efficient network configuration method.

On-demand system information (SI) request based on RA preamble (Msg1)

The terminal may request the on-demand system information which is required by the terminal, by transmitting a RA preamble to the network. In doing so, configuration parameter for the RA usable by the terminal may be configured as many as parameters maxSI-Message indicating a maximum number of on-demand system information messages provided from the network as shown in Table 4. The parameter maxSI-Message may be configured by the network using an RRC message, a MAC message, or a PHY message.

TABLE 4

| |
| --- |
| SI-Request-Config ::= SEQUENCE(SIZE(1..maxSI-Message)) OF SI-Request-Resources |

If the list includes only one configuration entry, the corresponding configuration may be evenly used in all of the on-demand system information messages provided from the network. Otherwise, respective configurations may be sequentially applied to the on-demand system information messages one to one in schedulingInfoList. The schedulingInfoList includes a list of system information messages supported by the cell, and may include transmission configuration information, such as periods, mapped system information blocks (SIBs), on-demand SI message broadcast status.

SchedulingInfoList and SI-request-config may be broadcast through SIB1, and may be included in a signal of other physical broadcast channel (PBCH). Alternatively, schedulingInfoList and SI-request-config may be included an RRC signal which is received and configured if the terminal accesses the network, and may be configured using other SIB or other MAC or PHY signal.

SI-Request-Resources may be configured based on a preamble index list and an SSB occasion mask indexes as shown in Table 5.

TABLE 5

| |
| --- |
| SI-Request-Resources ::= SEQUENCE { <br>   ra-PreambleIndexList   SEQUENCE(SIZE(1.. maximum number of SSB per Rach Occasion)) OF INTEGER(0..63), <br>   ra-ssb-OccasionMaskIndex   INTEGER(0..15) OPTIONAL <br> } |

With the configured schedulingInfoList and SI-request-config, the terminal may request the on-demand system information from the network in a manner, to be described, based on ra-preambleindexlist of SI-request-resources and # of SSBs per RACH occasion in the RACH configuration of the system information.

a) If # of SSBs per RACH occasion(N) is smaller than 1,
  i. a size of ra-preambleindexlist is 1, and the terminal recognizes one-to-one mapping relationships between preambles of ra-preambleindexlist and SSB indexes associated with the RACH occasions.

b) If # of SSBs per RACH occasion(N) is greater than or equal to 1,
  i. the size of ra-preambleindexlist is equal to # of SSBs per RACH occasion(N), and the terminal recognizes one-to-N mapping relationships between the preambles of ra-preambleindexlist and the SSB indexes associated with the RACH occasions. At this time, an i-th preamble of ra-preambleindexlist which is a preamble index list may be linked to each SSB index as follows: mod (SSB_index, # of preambles in the list)=i−1 or, c) If # of SSBs per RACH occasion(N) is smaller than or equal to 1, i. the size of ra-preambleindexlist is 1, and the terminal recognizes one-to-one mapping relationships between the preambles of ra-preambleindexlist and the SSB indexes associated with the RACH occasions.

d) If # of SSBs per RACH occasion(N) is greater than 1, i. the size of ra-preambleindexlist is equal to # of SSBs per RACH occasion(N), and the terminal recognizes one-to-N mapping relationships between the preambles of ra-preambleindexlist and the SSB indexes associated with the RACH occasions. At this time, the i-th preamble of ra-preambleindexlist which is the preamble index list may be linked to each SSB index as follows: mod (SSB index, # of preambles in the list)=i−1.

Using such rules, the terminal may know the association between the preambles of ra-preambleindexlist and the SSB indexes as shown in Table 6.

TABLE 6

1st preamble in list corresponds to SSB Index 0, N, 2N, 3N and so on.
2nd preamble in list corresponds to SSB Index 1, N + 1, 2N + 1, 3N + 1 and so on
3rd preamble in list corresponds to SSB Index 2, N + 2, 2N + 2, 3N + 2 and so on
To generalize: $i^{th}$ preamble in the list corresponds to SSB index j * N + (i − 1) where j = 0, 1, 2, and so on.

In other embodiment of the disclosure, the terminal may define the number of the preambles in ra-preambleindexlist as N, and apply the association of the SSB index.

In other embodiment of the disclosure, the terminal may define the number of messages in maxSI-Message as N, and apply the association of the SSB index.

It is provided that there are configurations which are greater than 1 in SI-Request-Config of Table 4, and smaller than the number of the maxSI-Messages. Provided that the number of on-demand system information messages in schedulinginfolist is N1 and the number of SI-Request-Resources in SI-Request-Config is N2, corresponding configurations may be applied to the on-demand system information in schedulingInfoList as follows:

Method 1: The terminal may apply the configuration by N1/N2. For example, if N1 is 6 and N2 is 3, the terminal may sequentially group and apply the on-demand system information messages in schedulinginfolist by N1/N2=6/3=2, to SI-Request-Resources in SI-Request-Config. 1f N1/N2 is not evenly divided to an integer, the terminal may round down. For example, if N1/N2=7/3=2.333, the terminal may apply the on-demand system information messages by two.

Method 2: The terminal may sequentially apply SI-Request-Resources of N2-ary SI-Request-Config to N2-ary on-demand system information messages of on-demand system information messages in N1-ary schedulinginfolist, and commonly apply SI-Request-Resources of SI-Request-Config firstly or lastly to remaining (N1-N2)-ary on-demand system information messages.

Method 3: The terminal may sequentially apply SI-request-resources of N2-ary SI-Request-Config to N2-ary on-demand system information messages of the on-demand system information messages in N1-ary schedulinginfolist, and sequentially apply SI-Request-Resources of N2-ary SI-Request-Config to N2-ary on-demand system information messages of the remaining (N1-N2)-ary on-demand system information messages, thus configuring N1 in total. For example, if N1=6 and N2=4, the terminal may sequentially apply SI-request-resources of SI-request-config to on-demand system information messages of first four schedulinginfolist, and sequentially apply first two SI-request-resources of SI-request-config to on-demand system information of the other two schedulinginfolist.

Method 4: The terminal may include and provide a list of the on-demand system information, sImessageindexlist of schedulinginfolist to apply the corresponding configuration as shown in Table 7, in SI-request-config.

TABLE 7

SI-Request-Resources::=    SEQUENCE {
    ra-PreambleIndexList    SEQUENCE(SIZE(1.. maximum number of SSB per Rach Occasion)) OF INTEGER(0..63),
    ra-ssb-OccasionMaskIndex    INTEGER(0..15) OPTIONAL,
    sImessageIndexList    SEQUENCE(SIZE(1.. maxSI-Message)) OF INTEGER(0.. maxSI-Message-1),
}

According to an embodiment of the disclosure, the system information message may be received as below.

The system information message may include system information of other SIB type than SIB1. SIB1 provides connections between such SIBs and the system information messages. Each SIB is included in only one system information message. The system information message is transmitted in a specific system information-window of a time axis which occurs on a periodic basis. The network may include and transmit a system information transmit window number, for example, Wn in each system information message.

In an embodiment of the disclosure, different system information messages having the same system information transmit window number Wn may be transmitted in the same system information-window.

According to another embodiment of the disclosure, the system information transmit window number may be provided implicitly. The network and the terminal may know the system information transmit window number n of an n-th system information message in SIB1, and transmit/receive the system information message in a system information transmit window corresponding to n.

Periods of the system information message and the system information transmit window may be provided from the network. Such period information may be included in a broadcast message, such as minimum system information (MSI), SIB1, or may be included in a downlink dedicated signal transmission, such as a response to a terminal's request or a handover command.

Using the system information transmit window number, the system information message period, and the system information transmit window length, the terminal may configure a system information receive window for receiving the system information message. In an advanced system, the terminal does not have to monitor the PDCCH to receive the system information message in the system information receive window.

The information sharing of the network and the terminal are as follows.

Step 1: The terminal determines the system information window number Wn of a specific system information message to receive. Wn is transmitted by the network in each system information message.

In other embodiment of the disclosure, the system information transmit window number may be provided implicitly. The network and the terminal may know the system information transmit window number n of the n-th system information message in SIB1, and transmit/receive the system information message in the system information transmit window corresponding to n.

Step 2: The terminal determines a length of the system information receive window to a positive integer X=(Wn−1)*w, where w denotes the length of the system information-window and is expressed in a slot unit.

Step 3: The terminal determines a start point of the system information receive window. The corresponding start point is a slot N1 in a radio frame N2, and may be determined as [N2*(number of slots in a radio frame)+N1+Offset) mod T=X. T denotes the system information message period in the slot unit and is provided in remaining minimum system information, remained system information (RMSI) (e.g., SIB1). Offset is provided in the RMSI (e.g., SIB1) in the slot unit.

The number of slots in the radio frame is determined in advance by a sub carrier spacing (SCS) used by a corresponding system, and SCS information may be provided in MIB/SIB1. The system information receive window lasts by the slot length w and then terminates.

Step 4: The terminal in the system information receive window observes the PDCCH to receive other system information (OSI). The terminal determines a PDCCH observation occasion according to OSI search space configuration. If the OSI search space is not configured in a designated system information receive window or not received, the terminal may observe the PDCCH at a corresponding occasion using a PDCCH observation occasion which is configured for the RMSI.

An apparatus and a method according to embodiments of the disclosure effectively achieve the BFR in the system.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a RA memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network, such as Internet, Intranet, local area network (LAN), wide LAN (WLAN), or storage area network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in wireless communication system, the method comprising:
    transmitting, to a base station, a random access preamble based on a random access procedure;
    receiving, from the base station, a random access response corresponding to the random access preamble, wherein the random access response includes an uplink grant;
    identifying whether the random access procedure is initiated by beam failure recovery; and
    transmitting, to the base station, an uplink message based on the uplink grant,
    wherein the uplink message includes beam failure recovery (BFR) media access control (MAC) control element (CE) after identifying that the random access procedure is initiated by beam failure recovery.

2. The method of claim 1, further comprising:
    identifying whether a reference signal for beam failure recovery is available or not based on pre-defined threshold,
    wherein the BFR MAC CE includes an identifier of the reference signal for the beam failure recovery in case that the reference signal for beam failure recovery is available.

3. The method of claim 2, wherein the reference signal comprises a channel state information-reference signal (CSI-RS).

4. The method of claim 1,
    wherein the uplink message includes cell-network temporary identifier (C-RNTI MAC CE) in case that pre-defined condition is met, and
    wherein the uplink message is generated based on a priority defined in order of the C-RNTI MAC CE and the BFR MAC CE.

5. The method of claim 1, further comprising:
    receiving, from the base station, information on a timer for performing beam failure recovery.

6. A method performed by a base station in wireless communication system, the method comprising:
    receiving, from a terminal, a random access preamble based on a random access procedure;
    transmitting, to the terminal, a random access response corresponding to the random access preamble, wherein the random access response includes an uplink grant; and
    receiving, from the terminal, an uplink message based on the uplink grant, wherein the uplink message includes beam failure recovery(BFR) media access control (MAC) control element (CE) after identifying that the random access procedure is initiated by beam failure recovery.

7. The method of claim 6, wherein the BFR MAC CE includes an identifier of a reference signal for the beam failure recovery in case that the reference signal for beam failure recovery is available.

8. The method of claim 7, wherein the reference signal comprises a channel state information-reference signal (CSI-RS).

9. The method of claim 6,
wherein the uplink message includes cell-network temporary identifier (C-RNTI MAC CE) in case that pre-defined condition is met, and
wherein the uplink message is generated based on a priority defined in order of the C-RNTI MAC CE and the BFR MAC CE.

10. The method of claim 6, further comprising:
transmitting, to the terminal, information comprising timer for performing beam failure recovery.

11. A terminal in wireless communication system, the terminal comprising:
a transceiver; and
a controller coupled to the transceiver and configured to:
transmit, to a base station, a random access preamble based on a random access procedure,
receive, from the base station, a random access response corresponding to the random access preamble, wherein the random access response includes an uplink grant,
identify whether the random access procedure is initiated by beam failure recovery, and
transmit, to the base station, an uplink message based on the uplink grant, wherein the uplink message includes beam failure recovery (BFR) media access control (MAC) control element (CE) after identifying that the random access procedure is initiated by beam failure recovery.

12. The terminal of claim 11, wherein the controller is further configured to:
identify whether a reference signal for beam failure recovery is available or not based on pre-defined threshold,
wherein the BFR MAC CE includes an identifier of the reference signal for the beam failure recovery in case that the reference signal for beam failure recovery is available.

13. The terminal of claim 12, wherein the reference signal comprises a channel state information-reference signal (CSI-RS).

14. The terminal of claim 11,
wherein the uplink message includes cell-network temporary identifier (C-RNTI MAC CE) in case that pre-defined condition is met, and
wherein the uplink message is generated based on a priority defined in order of the C-RNTI MAC CE and the BFR MAC CE.

15. The terminal of claim 11, wherein the controller is further configured to:
receive, from the base station, information comprising timer for performing beam failure recovery.

16. A base station in wireless communication system, the base station comprising:
a transceiver; and
a controller coupled to the transceiver and configured to:
receive, from a terminal, a random access preamble based on a random access procedure,
transmit, to the terminal, a random access response corresponding to the random access preamble, wherein the random access response includes an uplink grant, and
receive, from the terminal, an uplink message based on the uplink grant, wherein the uplink message includes beam failure recovery (BFR) media access control (MAC) control element (CE) after identifying that the random access procedure is initiated by beam failure re cove ry.

17. The base station of claim 16, wherein the BFR MAC CE includes an identifier of a reference signal for the beam failure recovery in case that the reference signal for beam failure recovery is available.

18. The base station of claim 17, wherein the reference signal comprises a channel state information-reference signal (CSI-RS).

19. The base station of claim 16,
wherein the uplink message includes cell-network temporary identifier (C-RNTI MAC CE) in case that pre-defined condition is met, and
wherein the uplink message is generated based on a priority defined in order of the C-RNTI MAC CE and the BFR MAC CE.

20. The base station of claim 16, wherein the controller is further configured to:
transmit, to the terminal, information comprising timer for performing beam failure recovery.

\* \* \* \* \*